United States Patent [19]

Gregory

[11] 4,354,050
[45] Oct. 12, 1982

[54] ELECTRIC CABLE JOINTS

[75] Inventor: Brian Gregory, Dartford, England

[73] Assignee: BICC Public Limited Company, London, England

[21] Appl. No.: 185,944

[22] Filed: Sep. 10, 1980

[30] Foreign Application Priority Data

Sep. 6, 1979 [GB] United Kingdom ............... 7930994

[51] Int. Cl.³ .......................................... H02G 15/25
[52] U.S. Cl. .............................. 174/22 R; 174/23 R; 174/20
[58] Field of Search ............... 174/22 R, 22 C, 23 R, 174/20, 21 R

[56] References Cited

U.S. PATENT DOCUMENTS 2,707,722  5/1955  Macardier ..................... 174/20 X
4,225,746  9/1980  Ball ............................. 174/21 R X

FOREIGN PATENT DOCUMENTS 390173  3/1933  United Kingdom ............... 174/22

Primary Examiner—Roy N. Envall, Jr.
Attorney, Agent, or Firm—Buell, Blenko, Ziesenheim & Beck

[57] ABSTRACT

In a stop joint between fluid-filled electric cables, the barrier to flow of dielectric fluid from one to the other of the cables comprises an elongate metal member, by which the cable conductors are both electrically and mechanically connected, and a flexible membrane of fluid-impermeable insulating material. The membrane, which is a single sheet of the insulating material, is sealed to the elongate metal member and to the fluid-tight joint enclosure and is incorporated in a fluid-impregnated laminated body of lappings of paper and/or other insulating material built up on the elongate metal member and on the cut back ends of the cables.

10 Claims, 3 Drawing Figures

ELECTRIC CABLE JOINTS

This invention relates to joints for fluid-filled electric cables, that is to say cables in which the dielectric of each cable conductor connected at the joint includes dielectric fluid, usually oil, which is free to flow along the cable conductors and in which the insulation of each cable conductor is a laminated body built up by lapping tapes of paper or other insulating material on to the cable conductor.

One form of joint employed with fluid-filled electric cables presents a barrier to the flow of dielectric fluid from one to the other of the two cable lengths electrically connected at the joint and this form of joint is generally known, and hereinafter will be referred to, as a stop joint.

In a known form of stop joint that is in general use, the barrier to the flow of dielectric fluid comprises an elongate metal member, by which the conductors of the cables to be jointed are both electrically and mechanically connected, and a preformed body of insulating synthetic resin which surrounds at least part of and is directly or indirectly sealed to the elongate metal member and to a fluid-tight enclosure for the joint. The elongate metal member may be a solid or hollow rod extending between and connected to two ferrules into each of which one of the conductors fits or it may itself be a ferrule, into each end of which one of the conductors fits, the metal member being provided with a central barrier to prevent dielectric fluid flowing from one conductor to the other. The preformed body of insulating synthetic resin surrounding the metal member is usually vacuum cast from an epoxy resin and sealed directly to the metal member or to another body surrounding and sealed to the metal member.

The preformed body of insulating synthetic resin constitutes a substantial proportion of the overall cost of the stop joint and it is an object of the present invention to provide a novel stop joint which is substantially cheaper than stop joints of equivalent size incorporating a preformed body or preformed bodies of insulating synthetic resin.

In the stop joint according to the present invention, the barrier to flow of dielectric fluid from one to the other of the two cable lengths connected at the joint comprises an elongate metal member, by which the cable conductors are both electrically and mechanically connected and, sealed to the elongate metal member and to the fluid-tight enclosure for the joint, a substantially flexible membrane comprising a single sheet of fluid-impermeable insulating material incorporated in a fluid-impregnated laminated body of lappings of paper and/or other insulating material built up on the elongate metal member and on the cut back ends of the two cable lengths.

The single sheet of fluid-impermeable insulating constituting the flexible membrane may or may not be preformed to any desired shape or configuration. As the fluid-impermeable insulating material, it is preferred to use a fluorocarbon polymer, such as polytetrafluroethylene, rubber or a polymeric material, such as polyethylene, polycarbonate, polypropylene and polyester, but any suitable fluid-impermeable insulating material may be used that is compatible with the insulating oil or other dielectric fluid.

The radially inner circumferential edge of the substantially flexible membrane may be sealed to the elongate metal member by any suitable means, for instance by clamping the radially inner circumferential edge of the membrane to the elongate metal member by a clamping ring that is integral with or separately formed with respect to the metal member or by means of adhesive tape that is compatible with the insulating oil or other dielectric fluid. Preferably, the radially outer circumferential edge of the substantially flexible membrane is secured to the joint enclosure by clamping the circumferential edge in the fluid-tight joint between two adjoining parts of the joint enclosure or by clamping the circumferential edge between a part of the joint enclosure and a separately formed clamping ring or between two separately formed clamping rings secured to the joint enclosure.

In extending between the elongate metal member and the joint enclosure, the substantially flexible membrane may follow any shape or configuration but, preferably, the membrane is sealed at an intermediate position on the elongate metal member and follows a substantially stepped path through the laminated body to a fluid-tight joint between two adjacent parts of the joint enclosure near one end of the joint structure.

Preferably, each end of the fluid impregnated laminated body built up on the elongate metal member and cut back ends of the two cable lengths and incorporating the substantially flexible membrane is profiled to form a stress cone and has built up therearound a tubular electrode which extends along the stress cone at a progressively increasing distance from the axis of the cable at that end of the joint. One or each end of the laminated body may be strengthened, for example by using for the tubular electrode helically wound wire, to resist distortion of the profile of the laminated body due to pressure of the insulating oil or other dielectric fluid.

The elongate metal member may be a solid or hollow rod extending between and connected to two ferrules into each of which one of the cable conductors fits or it may itself be a ferrule, into each end of which one of the conductors fits, the metal member being provided with an intermediate barrier to prevent insulating oil or other dielectric fluid flowing from one cable conductor to the other.

Where it is desired to provide, at one end of the stop joint, a path or paths for free flow of dielectric fluid from the or each cable conductor into the space bounded by the joint enclosure or vice versa, the or each path preferably extends through the built up laminated body as described in the Specification of our co-pending Patent Application No. 7928392 filed on the Aug. 15, 1979, or extends between the laminated body and the flexible membrane.

The invention is further illustrated by a description, by way of example, of a preferred stop joint with reference to the accompanying drawings, in which.

Figure 1:
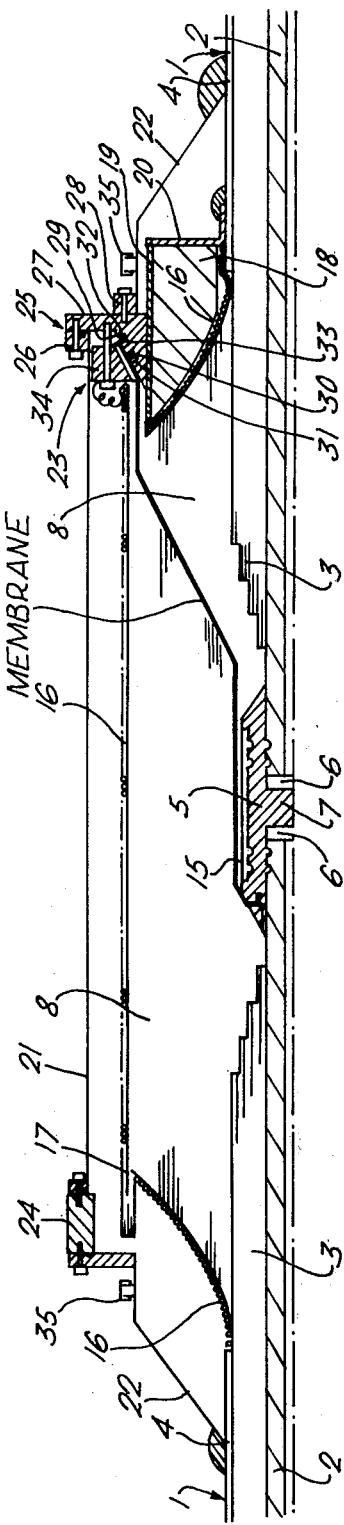
FIG. 1 is a fragmental sectional side view of the stop joint.
Figure 2:
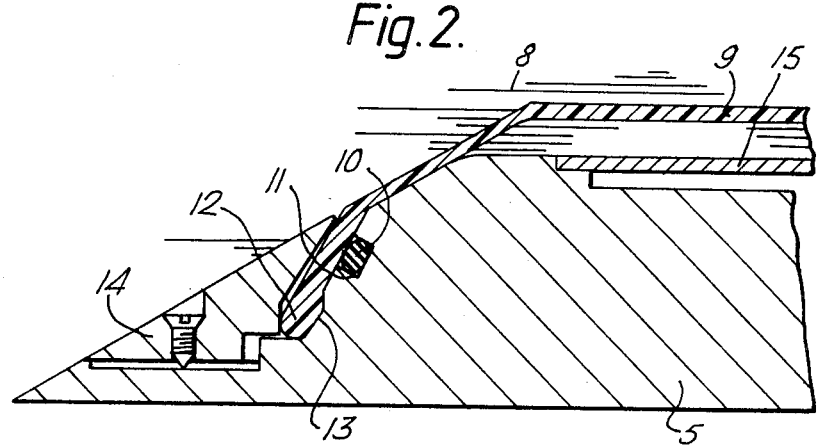
FIG. 2 shows the method employed, in the stop joint shown in FIG. 1, of sealing the flexible membrane to the elongate metal member.

Referring to FIGS. 1 and 2, the hollow conductors 2 of two cables 1 jointed at the stop joint are connected by means of an elongate metal member 5 having at each of its ends a ferrule 6 into which one of the conductors is crimped and having, between the ferrules, a barrier 7 which prevents flow of oil from one conductor to the other. The oil-impregnated paper of the conductor dielectric 3 and the sheath 4 of each cable 1 are cut back as shown and a fluid impregnated laminated body 8 built up of lappings of paper tape surrounds the elongate metal member 5 and the cut back ends of the two cables and is appropriately profiled at each of its ends to form a stress cone.

Incorporated in the fluid impregnated laminated body 8 is a flexible membrane 9 comprising a single sheet of fluid-impermeable polytetrafluoroethylene, the radially inner circumferential marginal edge of the membrane being sealed to the elongate metal member 5 and the radially outer circumferential marginal edge of the membrane protruding from the laminated body and being sealed to the joint enclosure 21. As will be seen on referring to FIG. 2, the radially inner circumferential marginal edge of the flexible membrane 9 overlies an 'O' ring 10 of elastomeric material housed in an annular groove 11 in the elongate metal member 5, the membrane having, integral with its inner edge, a rib 12 which engages and is sealed in a second annular groove 13 in the metal member. The flexible membrane 9 is clamped to the metal member 5 to effect a fluid-tight seal by a clamping ring 14. The elongate metal member 5 is surrounded by an electrical screen 15.

Overlying the fluid impregnated laminated body 8 is an electrical earth screen 16 comprising carbon loaded crepe paper and an overlying layer of helically wound tinned copper wire constituting a tubular electrode, electrical continuity of the earth screen being interrupted by an insulating part 17. At the end of the joint at which the radially outer circumferential marginal edge of the flexible membrane 9 is secured to the joint enclosure 21, the earth screen 16 is supported by a collar 18 which is surrounded by a sleeve 19, the collar and sleeve being urged towards the profiled end of the earth screen by a thrust plate 20 plumbed to the sheath 4 of the cable 1. The collar 18 prevents distortion of the profiled end of the laminated body 8 and earth screen 16 due to differences in oil pressure on opposite sides of the flexible membrane 9.

The joint enclosure 21 is divided transversely of its length into three parts, two end parts 22 which are plumbed to the sheaths 4 of the cables 1 and an intermediate sleeve 23 which, at one of its ends, is connected to one end part 22 through an insulating ring 24 and, at the other of its ends, is connected to the other end part 22 by a clamping arrangement 25. The clamping arrangement 25 includes an intermediate annular ring 27 to one face of which is bolted a collar 26 secured to the sleeve 23 and to the other face of which is bolted a collar 28 secured to the end part 22, 'O' rings of elastomeric material providing fluid-tight seals between the annular ring and the collars. The annular ring 27 has a frusto-conical surface 29 positioned within the joint enclosure and the radially outer circumferential marginal edge of the flexible membrane 9 overlies an 'O' ring 30 of elastomeric material housed in an annular groove 31 in the surface 29, the flexible membrane having, integral with its outer edge, a rib 32 which engages and is sealed in a second annular groove 33 in the frusto-conical surface 29. The flexible membrane 9 is clamped to the frusto-conical surface 29 to effect a fluid-tight seal by a clamping ring 34 having a frusto-conical surface of a shape corresponding to that of the surface 29.

Unions 35 in the end parts 22 of the joint enclosure 21 provide for impregnation and/or oil feed in service.

In forming the laminated body 8 and the incorporated flexible membrane 9, the electrical screen 15 is applied around the elongate metal member 5 and lappings of paper tape are built up around the electrical screen and over the cut-back conductor dielectric 3 of the cable 1 at the end of the stop joint at which the flexible membrane is to be secured to the joint enclosure 21 where a profiled end is formed which is to constitute a stress cone. The single sheet of fluid-impermeable polytetrafluoroethylene which is to constitute the flexible membrane 9 is then applied over the lappings of paper tape and is clamped to the elongate metal member 5. Further lappings of paper tape are then applied over the cutback conductor dielectric 3 of the other cable 1 and over the flexible membrane 9 to build up the laminated body 8 of the required radial thickness and to form at said other end of the stop joint a profiled end constituting a stress cone. An electrical earth screen as described is then applied over the laminated body 8, the exposed end of the flexible membrane is secured to the joint enclosure 21 as described and the joint enclosure is assembled about the joint.

Figure 3:
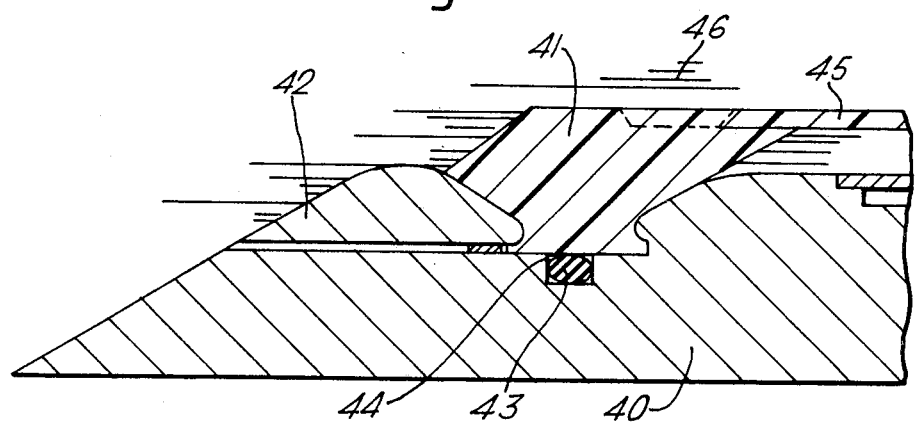
FIG. 3 shows one alternative method of sealing the flexible membrane to the elongate metal member.

In the alternative method of sealing a flexible membrane to an elongate metal member as shown in FIG. 3, a preformed annular body 41 of polyethylene is clamped to the elongate metal member 40 by a clamping ring 42, a fluid-tight seal being effected between the body and the metal member by means of an O ring 43 of elastomeric material housed in an annular groove 44 in the metal member. The radially inner circumferential marginal edge of a flexible membrane 45 of polyethylene incorporated in the built up laminated body 46 of paper tapes is welded to the annular body 41, the welding operation being effected during building up of the laminated body. Alternatively, the flexible membrane 45 may be secured to the annular body 41 by a suitable adhesive.

What I claim as my invention is:

1. A stop joint between two lengths of fluid-filled electric cable enclosed in a fluid-tight joint enclosure, in which joint the cable conductors are both electrically and mechanically connected by an elongate metal member and a laminated body of lappings of electrically insulating material is built up on the elongate metal member and on the cut back ends of the two cable lengths, wherein the barrier to flow of dielectric fluid from one to the other of the two cable lengths connected at the joint comprises the elongate metal member, a single sheet of fluid-impermeable insulating material incorporated in the laminated body, which sheet extends between and is sealed to the elongate metal member and to the fluid-tight enclosure to form a flexible membrane dividing the enclosure transversely into two parts.

2. A stop joint as claimed in claim 1, wherein the sheet of fluid-impermeable insulating material is preformed to a desired shape.

3. A stop joint as claimed in claim 1 or 2, wherein the fluid-impermeable insulating material is a polytetrafluoroethylene.

4. A stop joint as claimed in claim 1 or 3, wherein the radially inner circumferential edge of the substantially flexible membrane is sealed to the elongate metal member by a clamping ring.

5. A stop joint as claimed in claim 1 or 3, wherein the radially inner circumferential edge of the substantially flexible membrane is sealed to the elongate metal member by means of adhesive tape that is compatible with the dielectric fluid.

6. A stop joint as claimed in claim 1 or 3, wherein the radially outer circumferential edge of the substantially flexible membrane is secured to the joint enclosure by clamping the circumferential edge in the fluid-tight joint between two adjoining parts of the joint enclosure.

7. A stop joint as claimed in claim 1 or 3, wherein the radially outer circumferential edge of the substantially flexible membrane is secured to the joint enclosure by clamping the circumferential edge between a part of the joint enclosure and a separately formed clamping ring.

8. A stop joint as claimed in claim 1, wherein the membrane is sealed at an intermediate position on the elongate metal member and follows a substantially stepped path through the laminated body to a fluid-tight joint between two adjacent parts of the joint enclosure near one end of the joint structure.

9. A stop joint as claimed in claim 1, wherein each end of the laminated body is profiled to form a stress cone and has built up therearound a tubular electrode which extends along the stress cone at a progressively increasing distance from the axis of the cable at that end of the joint.

10. A stop joint is claimed in claim 9, wherein at least one end of the laminated body is strengthened to resist distortion of the profile of the laminated body due to pressure of the dielectric fluid.

* * * * *